United States Patent [19]
Hyde et al.

[11] Patent Number: 5,417,501
[45] Date of Patent: May 23, 1995

[54] BEARING ASSEMBLIES FOR ROTATING SHAFTS

[75] Inventors: Philip M. Hyde, Sherborne; Andrew M. Cave, Yeovil, both of England

[73] Assignee: Westland Helicopters Limited, Yeovil, England

[21] Appl. No.: 289,439

[22] Filed: Aug. 12, 1994

[30] Foreign Application Priority Data

Aug. 21, 1993 [GB] United Kingdom ............... 9317530

[51] Int. Cl.⁶ .................... F16C 19/52; F16C 43/00
[52] U.S. Cl. ................................. 384/542; 384/624
[58] Field of Search ............. 384/542, 537, 584, 585, 384/456, 624

[56] References Cited

U.S. PATENT DOCUMENTS

| | | | |
|---|---|---|---|
| 2,967,739 | 1/1961 | Hoffmann | 384/624 |
| 3,395,857 | 8/1968 | Petrie et al. | 415/9 |
| 4,425,010 | 1/1984 | Bryant et al. | 384/624 X |
| 4,557,679 | 12/1985 | Mori et al. | 384/542 X |
| 4,664,539 | 5/1987 | Li | 384/624 |

*Primary Examiner*—Thomas R. Hannon
*Attorney, Agent, or Firm*—Larson & Taylor

[57] ABSTRACT

A bearing assembly for a rotating shaft includes a plurality of frangible bolts located concentrically of an axis of rotation for attaching a bearing housing radial flange portion to a support structure, each having a frangible portion located between axially spaced-apart radial flanges whereby the bearing housing flange portion is spaced-apart axially from the support structure.

6 Claims, 2 Drawing Sheets

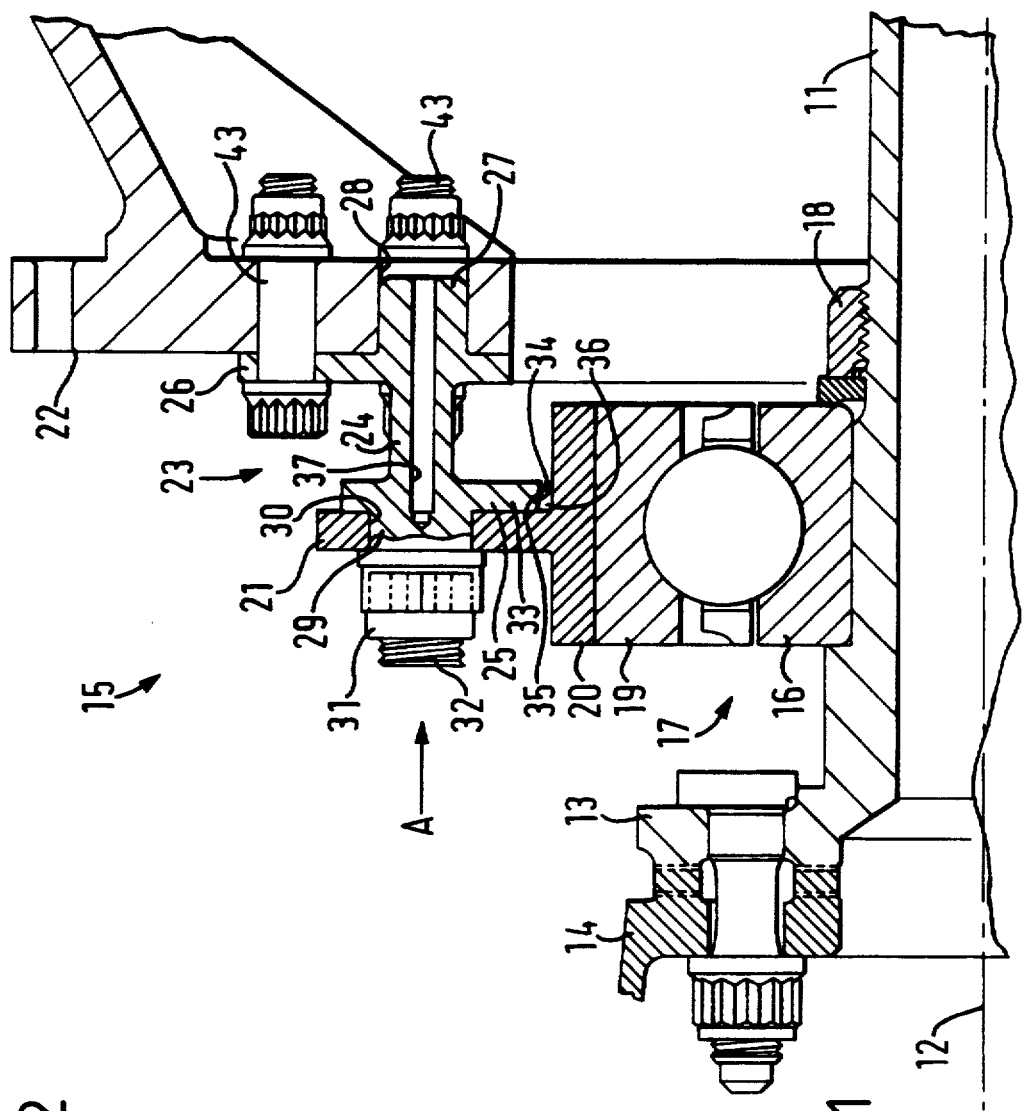
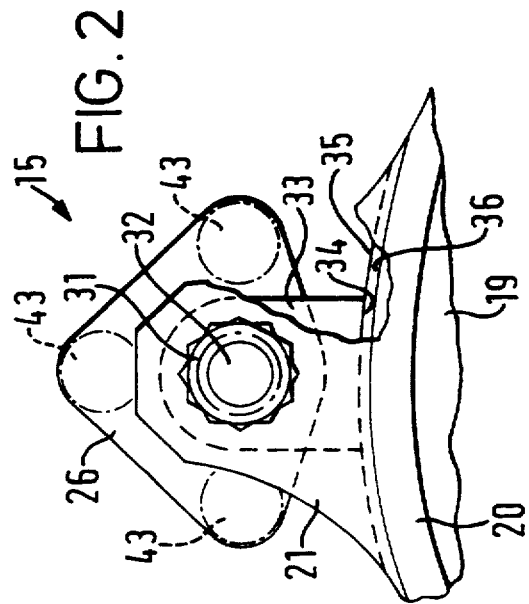

BEARING ASSEMBLIES FOR ROTATING SHAFTS

BACKGROUND OF THE INVENTION

1. Field of the Invention

This invention relates to bearing assemblies for rotating shafts and particularly to such assemblies incorporating fusible or frangible means for supporting shafts which may during operation become subjected to very high radial loads.

2. Description of the Prior Art

An example of such a bearing assembly is disclosed in U.S. Pat. No. 3,395,857 for supporting a compressor and turbine drive shaft in a gas turbine engine. The frangible means is designed to operate in the event of the loss for example of a turbine blade to permit radial movement of the drive shaft so as to prevent high radial loads being generated which could cause loss of engine attachment to the airframe. In this prior arrangement a plurality of frangible bolts serve to clamp a radial flange of an outer bearing housing to a support structure with mating surfaces in abutting relationship. The frangible bolts are designed to shear at a predetermined load and while this can be accurately predicted, the friction load between the mated surfaces is unknown which makes it extremely difficult to accurately predict the load at which shearing of the bolts will actually occur. Consequently, the prior arrangement may be unpredictable and unreliable in operation.

An objective of this invention therefore is to provide a bearing assembly which overcomes the aforementioned problems.

SUMMARY OF THE INVENTION

Accordingly, this invention provides a bearing assembly for supporting a shaft for rotation about an axis of rotation, comprising an inner race on the shaft, an outer race supported in a bearing housing having a radially extending flange portion, and a plurality of frangible bolts arranged concentrically of the axis of rotation for attaching the flange portion to a support structure, each of the frangible bolts including at least one frangible portion located between axially spaced-apart radial flanges adapted to engage said flange portion and the support structure, respectively, whereby the bearing housing flange portion is spaced-apart axially from the support structure.

In one embodiment the frangible portion may comprise an elongated circular cross section portion extending between the radial flanges and generally parallel to the axis of rotation of the shaft. The frangible portion may be provided with a circumferential shear groove or an axial bore extending from one end of the frangible bolt and throughout substantially the length of the frangible portion.

In another embodiment, the frangible portion may comprise annular shear neck portions located between radially inner and outer flange portions of the axially spaced-apart radial flanges. An annular surface of the outer annular flange portion preferably extends axially beyond the annular surface of the inner annular flange portion so as to provide during normal operation an axial spacing between the radial surfaces of the inner flange portions and adjacent surfaces of the bearing housing and support structure.

BRIEF DESCRIPTION OF THE DRAWINGS

The invention will now be described by way of example only and with reference to the accompanying drawings in which, FIG. 1 is a fragmentary sectioned side elevation of a bearing assembly constructed according to the invention, FIG. 2 is a fragmentary end view taken on arrow A of FIG. 1.

DETAILED DESCRIPTION OF THE DRAWINGS

Figure 3:
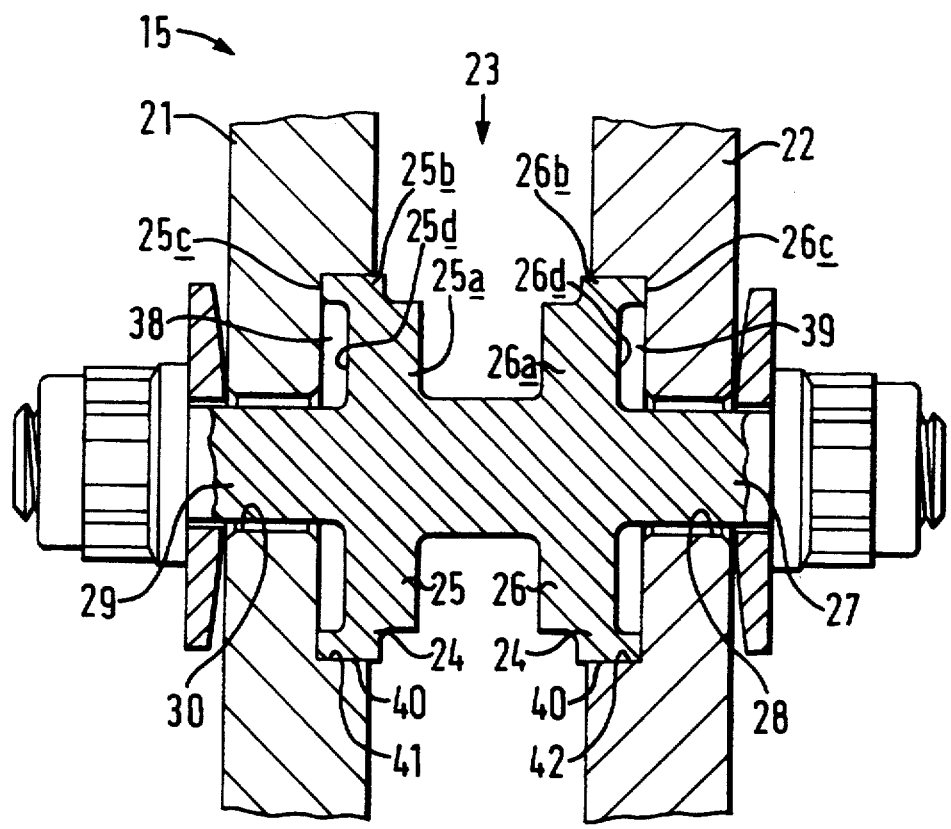
FIG. 3 is a fragmentary sectioned side elevation of part of the assembly of FIG. 1 showing a modification.

Referring now to FIGS. 1 and 2, a drive shaft 11 protrudes from a gas turbine engine (not shown) which during operation rotates the drive shaft about axis of rotation 12. A radial flange 13 at the end of the drive shaft 11 is bolted to a hub 14 which supports a plurality of radially extending fan blades (not shown).

Drive shaft 11 is supported by a bearing assembly generally indicated at 15 having an inner race 16 clamped on the drive shaft 11 by threaded nut 18. An outer race 19 contains a ball race 17 and is supported in an annular bearing housing 20 having eight radially extending flange portions 21 equi-spaced around its circumference (one only being shown). Each flange portion 21 is attached to a rigid support structure 22 by frangible bolts generally indicated at 23 located in a circle around the axis of rotation 12.

Each of the frangible bolts 23 includes a central elongated frangible portion 24 having a circular cross section and extending between axially spaced-apart radial flanges 25 and 26 for attachment respectively to the flange portions 21 of the bearing support housing 20 and to the support structure 22. In the embodiment of FIG. 1 an axial bore 37 extends from one end of the frangible bolt 23 through and beyond the length of the central frangible portion 24.

Each flange 26 is located by a protruding spigot 27 entered in a mating aperture 28 in the support structure 22 and is secured by three parallel bolts 43 located in perpendicularly opposed planes (see FIG. 2) so as to resist, during operation, bending loads in any direction.

A spigot 29 protruding from flange 25 is located in a mating aperture 30 in flange portion 21, and is secured by a nut 31 screwed on to a threaded spindle 32. Flange 25 includes an inwardly extending leg 33 having an inner radiussed surface 34 concentric of the axis of rotation for abutment against an outer surface 35 of a lip portion 36 on the bearing support housing 20. This abutment reacts the torque loads resulting from tightening of the nut 31 and prevents the torque loads being transferred into the elongated frangible portion 24.

The elongated frangible portion 24 of each frangible bolt 23 is located in normal operation so as to lie parallel to the axis of rotation 12, and the spaced-apart flanges 25 and 26 serve to retain the flange portions 21 of the bearing housing 20 and the support structure 22 in axially spaced-apart relationship. The elongated frangible portion 24 of each frangible bolt 23 is designed so as to fail at a predetermined radial load, and the axial bore 37 extending throughout the length of the portion 24 in the embodiment of FIG. 1 is provided to ensure that in a particular installation the frangible portion 24 will fail at the given radial load yet has sufficient strength to carry normal operational loads. In this respect, the length of the frangible portion 24 is designed to permit bending to occur (in circumstances hereinafter described) before final failure, allowing the actual failure load to be set somewhat higher than would otherwise be necessary, again allowing greater strength in the frangible portion 24 for carrying normal operational loadings.

Figure 4:
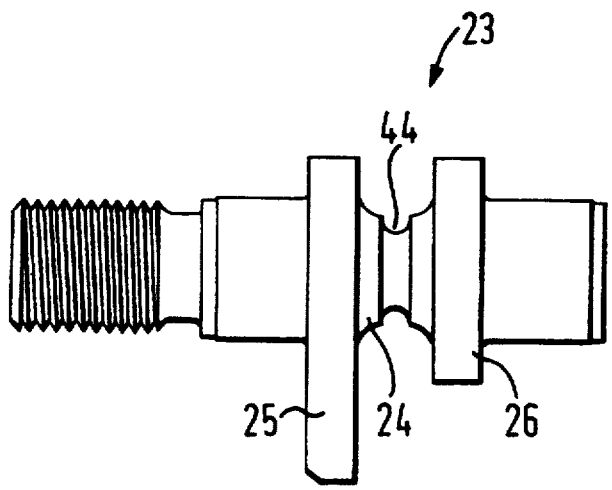
FIG. 4 is a fragmentary sectioned side elevation of part of the assembly of FIG. 1 showing a further modification.

In the modification illustrated in FIG. 4, the frangible bolt 23 does not have a central bore and the frangible portion 24 is provided with a circumferential shear groove 44 to promote an immediate shear type failure instead of the bending type failure of the embodiment of FIG. 1.

In the further modification illustrated in FIG. 3, each frangible bolt 23 includes two annular frangible shear neck portions 24 located respectively between radially inner and outer annular flange portions 25a and 25b and 26a and 26b of the axially spaced-apart flanges 25 and 26. Annular surfaces 25c and 26c of the outer annular flange portions 25b and 26b extend axially beyond annular surfaces 25d and 26d of the inner annular flange portions 25a and 26a so as to define annular axial spacings 38 and 39 between the inner annular surfaces 25d and 26d and adjacent surfaces of the flange portion 21 of the bearing housing 20 and the support structure 22 respectively.

In this embodiment the surfaces of spigots 27 and 29 are radially spaced-apart from the internal surfaces 28 and 30 in the flange portion 21 and support structure 22 respectively, and radial location is accomplished by external diameters 40 on outer flange portions 25b and 26b locating in mating recesses 41 and 42 in the flange portion 21 and support structure 22 respectively. The spigot 27 in this embodiment is extended by a threaded portion for engagement by a nut to secure the frangible bolt 23 to the support structure 22.

In normal operation of of this invention, the bearing assembly 15 supports, from the rigid support structure 22, the shaft 11 and the fan attached to hub 14 for rotation about axis 12.

In the event of damage to the fan, for example the loss of a fan blade, the fan becomes unbalanced causing very high radial loads on the end of drive shaft 11. In the embodiment of FIG. 1, the radial loads cause stress in the frangible portions 24 of the frangible bolts 23 and when the load exceeds the predetermined load the induced stress exceeds the material proof stress, and yielding of the frangible portions 24 occurs followed by failure after a few cycles. This failure frees from restraint the outer bearing housing 20 so as to permit radial movements of the end of the drive shaft 11 thereby preventing the generation of high radial loads in the attachment due to imbalance and thus maintaining integrity of the engine to airframe attachment.

In operation of the embodiment of FIG. 4, the circumferential shear groove 44 ensures shear failure of the frangible portion 24 as soon as the radial load exceeds the predetermined load such that the induced shear stress exceeds the material shear strength, to permit radial movement of the end of the drive shaft 11.

Similarly, in the embodiment of FIG. 3, an excessive radial load causes immediate failure of the two frangible shear neck portions 24 to permit separation and release of the outer flange portions 25b and 26b again to free the outer bearing housing 20 from radial restraint. In this embodiment, a limited axial restraint of the flange portion 21 from the support structure 22 is provided due to the axial spacings 38 and 39 which permit abutment, in the event of a failure of the frangible portions 24, between radial surfaces 25d and 26d and facing surfaces of the flange portion 21 and the support structure 22.

Thus, the bearing assembly 15 of this invention relies only on the accurately predictable proof stressing of the frangible portions 24 of the frangible bolts 23, thereby ensuring entirely predictable and accurate failure characteristics. The invention eliminates the unknown and unpredictable friction element of the prior arrangement and provides a bearing assembly which overcomes the aforementioned problems of that and like arrangements.

Whilst several embodiments have been described and illustrated it will be understood that many modifications may be made without departing from the scope of the invention as defined by the appended claims. For example, the cross-sectional shape and size of the frangible portion 24 of the frangible bolts 23 will vary depending on the requirements of a particular application, as will the actual number of frangible bolts used in different applications. Any suitable attachment means can be used to attach the frangible bolts 23 between the bearing housing 20 and the support structure 22, and the individual flange portions 21 can be formed as a single continuous flange. The inner race 16 of ball bearing 17 may be formed integral with the shaft 11 and any other suitable type of bearing may be used. Whilst described in relation to installation in a gas turbine engine, the bearing assembly of this invention can be used for supporting a rotating shaft in any installation where the shaft may become subjected to high radial loads.

What is claimed is:

1. A bearing assembly (15) for supporting a shaft (11) for rotation about an axis of rotation (12), comprising an inner race (16) on the shaft, an outer race (19) supported in a bearing housing (20) having a radially extending flange portion (21) and a plurality of frangible bolts (23) arranged concentrically of the axis of rotation for attaching said flange portion to a support structure (22), wherein each frangible bolt includes at least one frangible portion (24) located between axially spaced-apart radial flanges (25, 26) adapted to engage said flange portion (21) and the support structure (22), respectively, whereby said bearing housing flange portion (21) is spaced-apart axially from said support structure (22).

2. A bearing assembly as claimed in claim 1, wherein said frangible portion comprises an elongated circular cross section portion (24) extending between said radial flanges and generally parallel to said axis of rotation of the shaft.

3. A bearing assembly as claimed in claim 2, wherein said frangible portion (24) is provided with a circumferential shear groove (44).

4. A bearing assembly as claimed in claim 2, wherein each said frangible bolt includes an axial bore (37) extending from one end and throughout substantially the length of said frangible portion.

5. A bearing assembly as claimed in claim 1, wherein said frangible portion comprises annular shear neck portions located between radially inner and outer flange portions (25a, 25b, 26a, 26b) of said axially spaced-apart flanges (25, 26).

6. A bearing assembly as claimed in claim 5, wherein an annular surface (25c, 26c) of said outer flange portion (25b, 26b) extends axially beyond a radial surface (25d, 26d) of said inner flange portions (25a, 26a) so as to provide during normal operation an axial spacing (38, 39) between said radial surfaces of the inner flange portions and adjacent surfaces of said bearing housing flange (21) and said support structure (22).

* * * * *